3,497,577
METHOD OF PRODUCTION OF PLASTIC LENSES WITH ASPHERICAL SURFACES

Otto Wichterle, Prague, Czechoslovakia, assignor to Ceskoslovenska akademie ved, Prague, Czechoslovakia
No Drawing. Filed Feb. 14, 1967, Ser. No. 615,930
Claims priority, application Czechoslovakia, Feb. 15, 1966, 971/66
Int. Cl. C08f 47/12; B29c 25/00
U.S. Cl. 264—1      6 Claims

ABSTRACT OF THE DISCLOSURE

Lenses having convex, aspherical, refractive surfaces are made from a copolymer blank of ethyleneglycol monomethacrylate and a small amount of the corresponding dimethacrylate as a cross-linking agent by heating the blank above its glass transition point, compressing it hot to set up internal stresses, cooling the compressed blank below the transition point to fix the stresses, machining the cold blank into a lens having surfaces of circularly arcuate cross section, and thereafter relaxing the internal stresses by reheating above the transition point or by swelling, whereby the machined surfaces are deformed. A method for predicting the utlimate refractive power of the lens is given.

---

This invention relates to the preparation of plastic lenses, and particularly to the preparation of lenses having paraboloidal or other aspherically convex surfaces.

While plastic lenses having aspherical concave surfaces can be prepared relatively easily, it has been much more difficult and costly heretofore to produce lenses having aspherical convex surfaces.

Aspherical convex lenses are required in contact lenses to correct for deviations of the cornea from a precisely spherical shape, to provide a paraboloidal front surface, and for correction of astigmatism not due to the shape of the cornea.

The known methods for producing convex aspherical surfaces by machining are prohibitively costly, and are not being used in the manufacture of contact lenses for this reason.

According to the method of this invention, contact lenses having aspherical surfaces can be produced on equipment commonly employed for making spherically curved lenses. A blank essentially consisting of a cross-linked polymer capable of plastic deformation is heated above its glass transition point, plastically deformed in compression at the elevated temperature until internal stresses are set up, and cooled below the transition point to fix the stresses. The cold blank is then machined to remove a portion of the material and shape the remainder into a lens having a surface of circularly arcuate cross section about an axis. When the temperature of the machined blank is thereafter raised above the glass transition temperature, or the polymer is swelled by contact with a solvent, the internal stresses are relaxed, and the machined surface is deformed in a manner which is predictable by test or by calculation.

Suitable cross-linked polymers include those of methyl methacrylate with glycol dimethacrylate, or p-chlorostyrene with divinyl benzene, and of ethyleneglycol monomethacrylate with the corresponding dimethacrylate.

The blank is deformed in a mold by contact with solid mold elements, or by the pressure of a gas or liquid. If a temperature gradient is maintained in the blank during compression, a corresponding gradient is set up in the internal stresses created by deformation, and in the ultimate deformation of machined surfaces during stress relaxation. If a cylindrical blank having a height of 10 mm. and a diameter of 10 mm. is preheated to the softening temperature and subsequently cooled by heat loss from the cylindrical wall, the axial pressure is applied while the core is still soft and the periphery is solidified, a lens machined from the cooled blank shows reduced spherical aberration after stress relaxation.

According to the invention, lenses are ground to a spherical surface from a polymer having plastic memory, that is, from a sparingly cross-linked polymer. If the blank is treated according to this invention, a machined spherical surface may become aspherical after stress relaxation, a cylindrical surface non-cylindrical. Most important, paraboloidal convex surfaces may thus be produced. The plastic deformation in compression requires a regular reversible displacement of the mass of the polymer. The displaced mass is fixed by cooling below the glass transition temperature, and machining (cutting, grinding, polishing) must be carried out under conditions to prevent heating of the plastic above its transition temperature and premature stress relaxation.

The method of the invention may be employed for producing plastic lenses having convex parabolic surfaces which cannot be made by other practical processes. This holds particularly for lenses made of sparingly cross-linked polymethylmethacrylate and similar transparent plastics which can still be softened by heat and plastically deformed while hot. The method lends itself to the manufacture of lenses for inexpensive cameras, spectacles, magnifiers, analytical balances, and the like.

When relatively large lenses are made from hard polymers, it is necessary to be careful during stress relaxation in order to avoid deformation of the softened material by gravity. The machined blanks are preferably heated slowly and evenly on a conforming base. In soft contact lenses of hydrophilic polymer gels, stress is relaxed by swelling with water, alcohol, or like solvents, and no particular precautions are necessary.

The plastic deformation in compression necessary for producing a desired deformation of a machined surface may be calculated in advance or determined experimentally, for example, by inscribing a grid of intersecting lines into a plate cut from a deformed blank, and by observing the changes in the dimensions and the shape of the grid after stress relaxation. In some plastics, the distribution of the internal stresses can be observed directly in polarized light.

The manner in which the change of refractive power in a machined lens during stress relaxation can be calculated in advance will be illustrated in the following examples.

EXAMPLE 1

A plastic body prepared by polymerization of a mixture of 99.5% ethyleneglycolmethacrylate, 0.4% of the corresponding dimethacrylate, and 0.1% diisopropyl percarbonate was a cylinder having a diameter $d$ of 12 mm. and a height $h$ of 6 mm. It was placed in a cylindrical bore in a block of Duralumin having an internal diameter of 12.1 mm., and the two ends of the bore were closed by conforming plungers whose spherically concave end faces had a radius of curvature R of 10 mm.

The Duralumin block was heated to 150° C., and five minutes after this temperature was reached, the two plungers were pressed against each other with a force of 50 kilograms. Pressure was then maintained while the mold assembly was cooled to ambient temperature at which it was taken apart. The plastic blank had assumed a barrel shape and was machined in a conventional manner to produce a contact lens having a central thickness $t$ of 0.5 mm. and a dioptric value D of −5.

The blank was submersed in boiling xylene until internal stresses were relaxed, and its central thickness thereafter was found to be 0.28 mm. and the dioptric strength $D_1$ of $-8.8$, the initial and final parameters being related by the equations $$t_1 = t\left(1 - \frac{d^2}{8Rh}\right) \text{ and } D_1 = D\left(1 - \frac{d^2}{8hR}\right) - \frac{800t}{hR}$$

EXAMPLE 2

A cylindrical rod of the polymer described in Example 1 having a diameter $d$ was placed in a cylindrical metal mold having a larger internal diameter $d_1$. After heating to 150° C., the rod was compressed in the mold by means of a plunger until it spread radially to conform to the mold. It was then cooled under pressure, and made into contact lenses. When internal stresses in the contact lenses were relaxed by heating in a drying oven to 145° C., the lenses increased in central thickness from a machined dimension $t$ to a thickness $t_1$ according to the relationship $$t_1 = t\left(\frac{d_1}{d}\right)^2$$

and their surfaces which had been machined to a spherical curvature of radius R became elliptical, the axis of the ellipse perpendicular to the optical axis having decreased to a value of $$2R\frac{d}{d_1}$$

and the axis of the ellipse coinciding with the optical axis having increased to a value of $$2R\left(\frac{d_1}{d}\right)^2$$

EXAMPLE 3

A cylindrical body of the plastic described in Example 1 was confined between two parallel plates whose spacing was equal to the height of the cylinder, and compressed under the temperature conditions described above between two jaws having faces of semi-elliptical cross section until the cross sectional shape of the plastic body became an ellipse equal in area to the circle of the original cross section. When the internal stresses were relaxed in a lens made from the plastic body, its dimensions in a direction transverse of the original axis changed in the ratio of the major and minor axes of the ellipse while the dimensions in the direction of the original cylinder axis remained unchanged.

EXAMPLE 4

Material was removed from opposite faces of a cylindrical block of plastic as described in Example 1 to form spherical depressions having a central depth of 1 mm. below the levels of the edge. The shaped block was then heated to 135° C. and compressed in the absence of air between two flat surfaces until it assumed the shape of a cylinder. A contact lens was ground from the blank so obtained, and internal stresses were relaxed by contact of the lens with water. It then had aspherical surfaces.

What we claim is:
1. A method of producing a shaped plastic body which comprises:
   (a) heating a body of a transparent plastic having plastic memory to a temperature above the glass transition point of said plastic at which said plastic is capable of plastic memory;
   (b) plastically deforming said body at said temperature until internal stresses are set up in said body;
   (c) cooling the deformed body below said temperature whereby said stresses are fixed;
   (d) machining away a portion of the cooled body to shape a surface on the remainder of said body; and
   (e) relaxing said stresses in the machined body until said surface is deformed.
2. A method as set forth in claim 1, wherein said stresses are relaxed by heating said machined body above said temperature.
3. A method as set forth in claim 1, wherein said stresses are relaxed by contacting said body with a solvent until the body swells.
4. A method as set forth in claim 1, wherein said plastic is sparingly cross-linked, and said body is deformed in compression.
5. A method as set forth in claim 1, wherein the surface shaped on said cooled body is of circularly arcuate cross section.
6. A method as set forth in claim 5, wherein said cooled body is machined to the shape of a lens having said surface.

References Cited

UNITED STATES PATENTS

| | | | |
|---|---|---|---|
| 2,252,504 | 8/1941 | Hahn | 264—230 |
| 2,305,945 | 12/1942 | Williams et al. | 264—1 |
| 2,319,014 | 5/1943 | Smith | 264—1 |
| 3,000,057 | 9/1961 | Swedlow et al. | 264—1 |
| 3,038,210 | 6/1962 | Hungerford et al. | 264—1 |
| 3,064,401 | 11/1962 | Mooney | 264—1 |
| 3,079,736 | 3/1963 | Kratt | 51—217 |
| 3,079,737 | 3/1963 | Kratt | 51—217 |
| 3,171,869 | 3/1965 | Weinberg | 264—1 |
| 3,361,858 | 1/1968 | Wichterle | 264—1 |

JULIUS FROME, Primary Examiner

A. H. KOECKERT, Assistant Examiner

U.S. Cl. X.R.

264—162, 230; 350—189; 351—160